United States Patent
Cho (10) Patent No.: US 7,528,899 B2
(45) Date of Patent: May 5, 2009

(54) LIQUID CRYSTAL DISPLAY DEVICE HAVING ELECTROMAGNETIC SHIELDING MEANS

(75) Inventor: Chun-Hyun Cho, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 31 days.

(21) Appl. No.: 10/487,999

(22) PCT Filed: Sep. 13, 2002

(86) PCT No.: PCT/KR02/01721

§ 371 (c)(1),
(2), (4) Date: Feb. 27, 2004

(87) PCT Pub. No.: WO03/025660

PCT Pub. Date: Mar. 27, 2003

(65) Prior Publication Data

US 2004/0239828 A1    Dec. 2, 2004

(30) Foreign Application Priority Data

Sep. 14, 2001    (KR) .............. 2001-0056839

(51) Int. Cl.
    *G02F 1/1333*    (2006.01)
(52) U.S. Cl. .......................... 349/59; 349/58
(58) Field of Classification Search ............ 349/58–60; 362/630–634
    See application file for complete search history.

(56) References Cited

U.S. PATENT DOCUMENTS

| | | | |
|---|---|---|---|
| 3,845,604 A | | 11/1974 | Ottosson ............ 52/758 H |
| 4,920,409 A | * | 4/1990 | Yamagishi ............ 348/791 |
| 5,835,139 A | * | 11/1998 | Yun et al. ............ 349/58 |
| 5,929,950 A | * | 7/1999 | Matsuda ............ 349/60 |
| 5,986,726 A | * | 11/1999 | Murai ............ 349/59 |
| 6,177,971 B1 | * | 1/2001 | Jung et al. ............ 349/60 |
| 6,181,390 B1 | * | 1/2001 | Wang et al. ............ 349/58 |
| 6,256,075 B1 | * | 7/2001 | Yang ............ 348/843 |
| 6,380,998 B1 | * | 4/2002 | Arai ............ 349/152 |
| 6,480,245 B1 | * | 11/2002 | Sakamoto et al. ............ 349/59 |
| 6,507,484 B2 | * | 1/2003 | Fukuyoshi ............ 361/681 |
| 6,667,779 B2 | * | 12/2003 | Lee ............ 349/58 |
| 6,741,299 B2 | * | 5/2004 | Fukayama et al. ............ 349/58 |
| 2001/0050732 A1 | * | 12/2001 | Okamoto et al. ............ 349/58 |

FOREIGN PATENT DOCUMENTS

| | | |
|---|---|---|
| DE | 818 845 | 7/1949 |
| DE | 32 45948 A1 | 6/1984 |
| FR | 984.654 | 7/1951 |
| FR | 1.380.911 | 3/1965 |

(Continued)

*Primary Examiner*—Andrew Schechter
(74) *Attorney, Agent, or Firm*—Haynes and Boone, LLP (57) ABSTRACT

Disclosed is a liquid crystal display device that can simplify the assembly process of the liquid crystal display device and improve productivity. A sidewall of a shield case is extended to correspond to a sidewall of a top chassis. A burring is formed at the sidewall of the shield case to coupled with a screw, the burring corresponding to an engagement hole formed at the sidewall of the top chassis. Therefore, the production cost can be reduced by decreasing the parts of the liquid crystal display device, and the productivity can be improved due to simplification of the assembly process of the liquid crystal display device.

18 Claims, 12 Drawing Sheets

FOREIGN PATENT DOCUMENTS

| | | |
|---|---|---|
| FR | 2 445 124 | 7/1980 |
| GB | 2 031 051 A | 4/1980 |
| JP | 10-020308 | 1/1998 |
| JP | 2000-181362 | 6/2000 |
| JP | 2001-075485 | 3/2001 |
| WO | WO 97/25537 | 7/1997 |

* cited by examiner

LIQUID CRYSTAL DISPLAY DEVICE HAVING ELECTROMAGNETIC SHIELDING MEANS

TECHNICAL FIELD

The present invention relates to a liquid crystal display device, and more particularly relates to a liquid crystal display device, which can improve productivity by simplifying an assembly process of the liquid crystal display device.

BACKGROUND ART

Recently, information processing devices has rapidly improved to have various designs, various functions, and more rapid speed in processing information. A display device is an interface to convert electrical information signal to visually recognizable optical information signal in these information processing devices.

These days, a liquid crystal display (LCD) device has developed and has many profit functions such as light weight, small size, full-color, high resolution, etc., in comparison with a cathode ray tube (CRT) display device. Generally, the LCD device converts a specific molecular arrangement of liquid crystal to another molecular arrangement by applying a voltage thereto, and displays an image by visually converting the changes of optical characteristics, such as double refraction, optical rotatory polarization, a dichroism and light scattering, etc.

Figure 1:
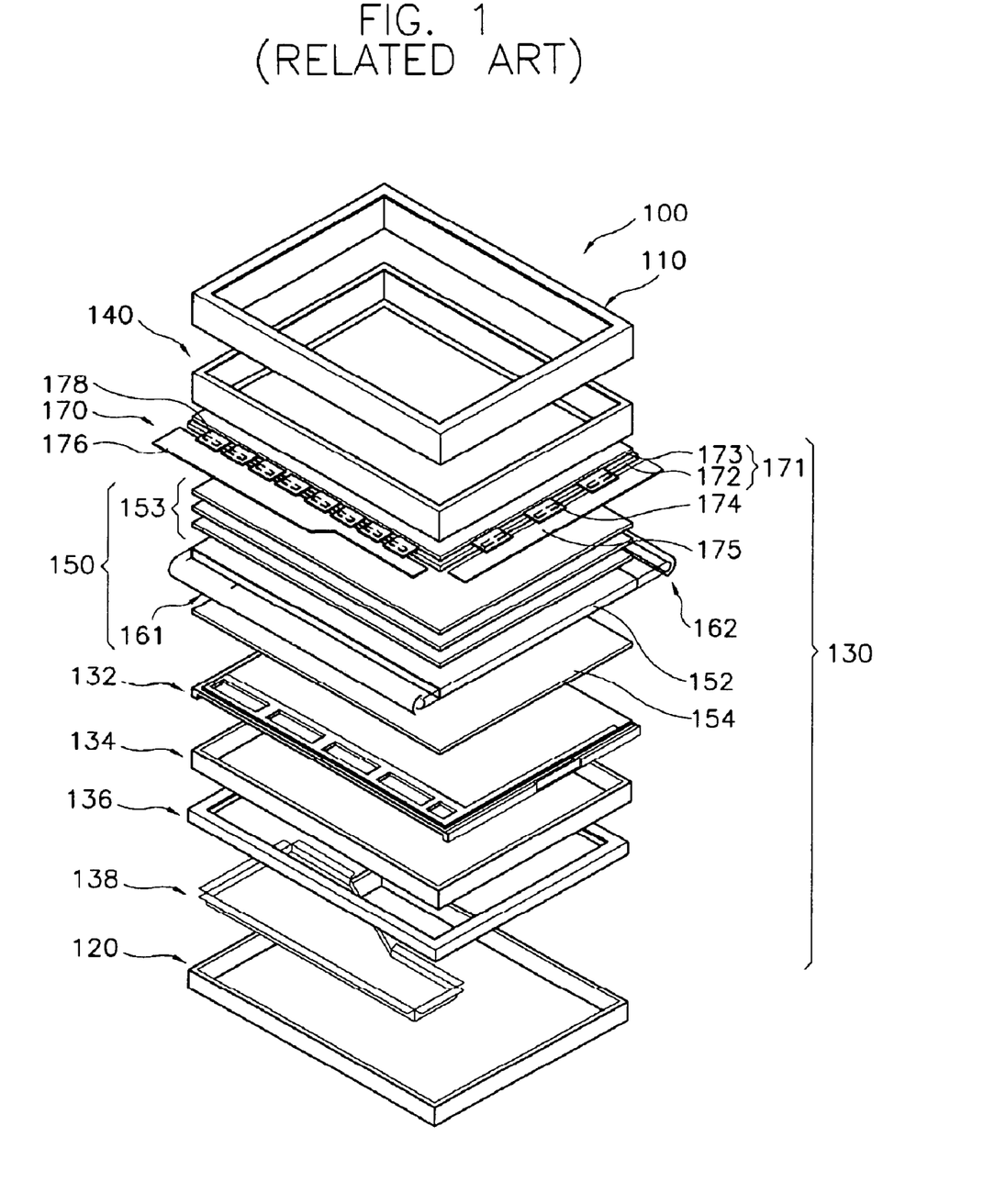
FIG. 1 is an exploded perspective view schematically illustrating the conventional LCD.
Figure 2:
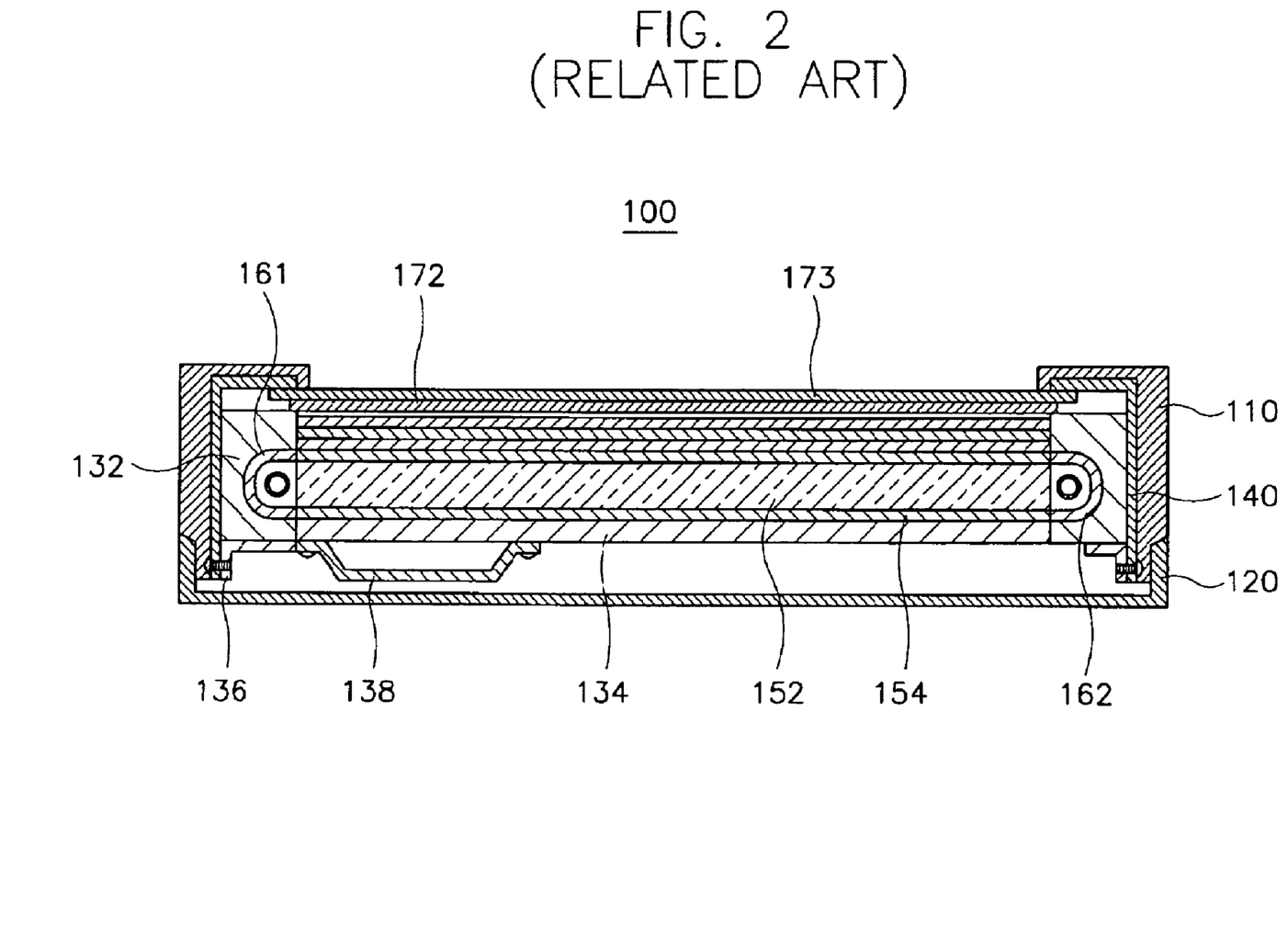
FIG. 2 and FIG. 3 are sectional views illustrating the structure of the LCD in FIG. 1.
Figure 3:
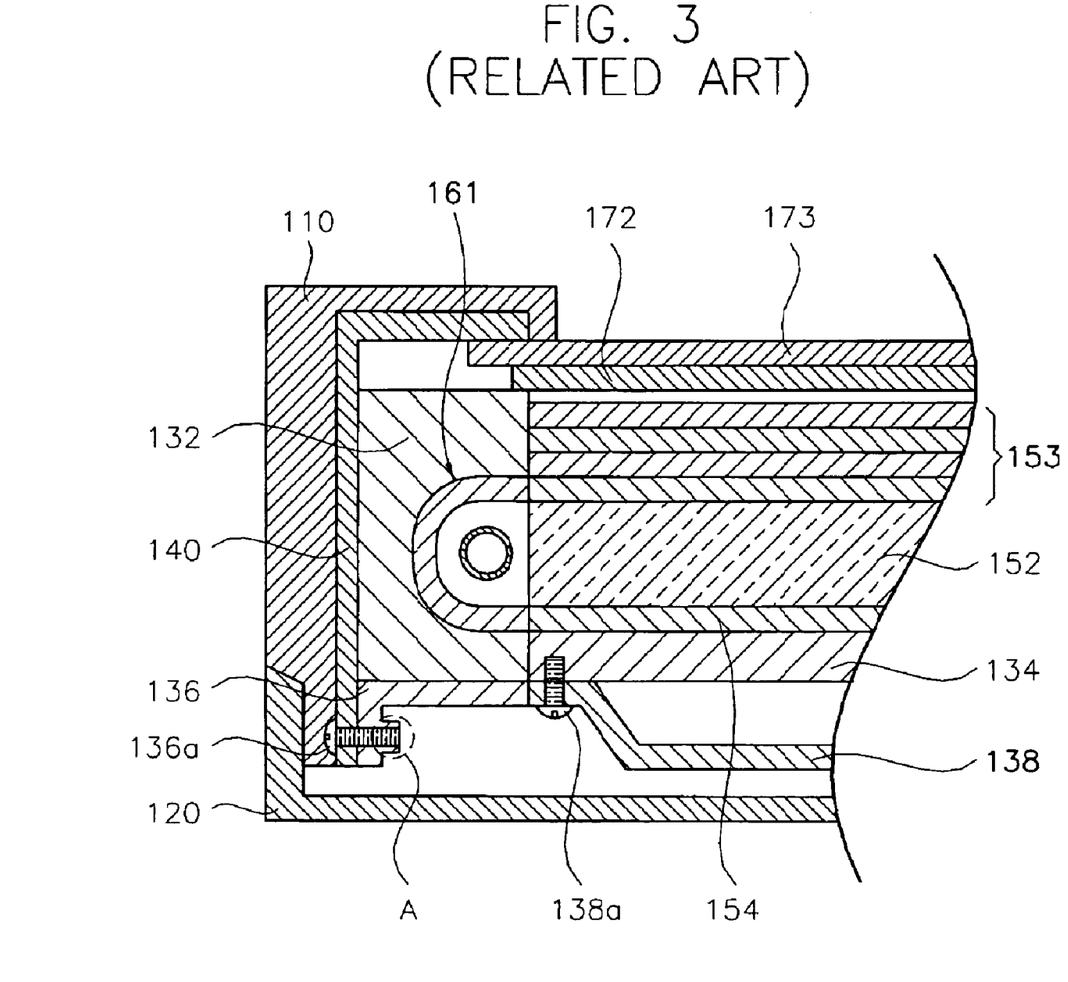
Figure 4:
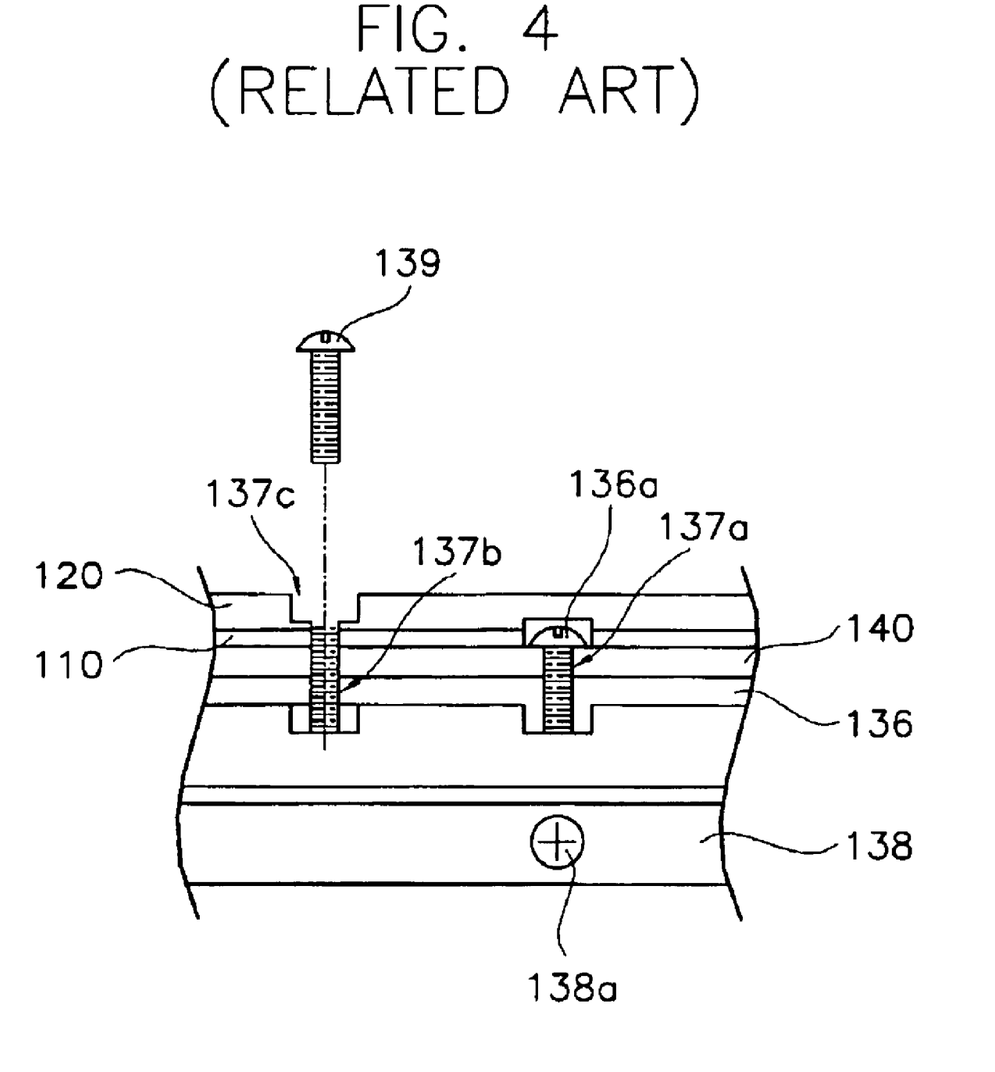
FIG. 4 is a sectional view illustrating the bonding structure of the LCD in FIG. 1.

FIG. 1 is an exploded perspective view schematically illustrating the conventional LCD, FIG. 2 and FIG. 3 are sectional views illustrating the structure of the LCD in FIG. 1, and FIG. 4 is a sectional view illustrating the bonding structure of the LCD in FIG. 1.

Referring to FIG. 1, the related LCD 100 includes a liquid crystal display module 130 for displaying an image by applying image information signal, a front case 110 and a rear case 120 for receiving the liquid crystal display module 130. The liquid crystal display module 130 includes a display unit 170 and a back light assembly 150 for providing light to the display unit 170.

The display unit 170 has a liquid crystal display panel 171, a data and a gate printed circuit board (PCB) 176 and 175, and a data and a gate tape carrier package (TCP) 178 and 174.

The liquid crystal display panel 171 includes a thin film transistor (TFT) substrate 172, a color filter substrate 173 and liquid crystal (not shown in FIG. 1).

The TFT substrate 172 is a transparent glass substrate and thin film transistors are arranged in a matrix shape on the TFT substrate 172. A data line and a gate line are connected to a source and gate terminal of the thin film transistor, respectively, and a pixel electrode made of indium tin oxide (ITO), which is transparent and conductive, is formed at a drain terminal of the thin film transistor.

The color filter substrate 173 is disposed opposite to the TFT substrate 172. The color filter substrate has RGB pixels formed by thin film process, as a color pixel. Common electrodes made of ITO are formed on the surface of the color filter substrate 173.

When a predetermined voltage of electric power is applied to the gate and source terminal of the transistor of the TFT substrate 172 and the TFT is turned on, an electric field is formed between the pixel electrode and the common electrode of the color filter substrate. The arrangement angle of the liquid crystal interposed between the TFT substrate 172 and the color filter substrate 173 is changed by this electric field, and each pixel can have a required color since the transmissivity of the light varies according to the varied arrangement angle of the liquid crystal. A driving signal and a timing signal are applied respectively to the gate line and the data line connected with the TFT in order to control the arrangement angle and the arrangement period of the liquid crystal in the liquid crystal display panel 171.

The back light assembly 150 is disposed under the display unit 170 to provide uniform light to the display unit 170. The back light assembly 150 includes lamp units 161 and 162 located at both sides of the liquid crystal display module 130 to emit a light, a light guide plate (LGP) 152 for guiding the light toward the display unit 170 and for changing the path of the light, a plurality of optical sheets 153 for making a uniform brightness of the light emitted from the LGP 152, and a reflection plate 154 disposed under the LGP 152 and reflecting the light leaking from the LGP 152 toward the LGP 152 again to improve the effectiveness of the light.

The back light assembly 150 is received in a mold frame 132 having a bottom chassis 134 therein. Also, the display unit 170 is disposed in the mold frame 132. A top chassis 140 is coupled with the mold frame 132 to correspond to the mold frame 132 in order to prevent the display unit 170 from being separated from the mold frame 132.

Then, a bracket 136 is disposed to correspond to an extended sidewall of the top chassis 140 and is received on the rear surface of the mold frame 132. Also, a shield case 138 is mounted on the rear surface of the bottom chassis 134, cuts off electromagnetic wave from an inverter circuit (not shown), and provides electric power to the display unit 170, etc. After that, the front case 110 and the rear case 120 are coupled opposite to each other to finish the assembly of the LCD.

A first engagement hole 137a and a second engagement hole 137b are formed at both the sidewalls of the bracket 136 and the top chassis 140. The number of the engagement holes is variable according to the design of the LCD device. A first screw 136a is coupled with the first engagement hole 137A to fix the bracket 136 and the top chassis 140.

On the other hand, as shown in FIG. 4, a third engagement hole 137c passing through the front cases 110 and the rear case 120 is formed at both the sidewalls of the front case 110 and the rear case 120, the third engagement hole 137c corresponding to the second engagement hole 137b. The front and rear case 110 and 120 are coupled with the liquid crystal module 130 by means of the second screw 139 coupled with the second and third engagement hole 137b and 137c. Also, a burring A (refer to FIG. 3) is formed at the bracket 136 where the second engagement hole 137b is formed, so that the second screw 139 is coupled firmly with the second and third engagement hole 137b and 137c.

However, this LCD has the following disadvantages.

First, the bracket 136 is necessary to form the burring A for the first and second engagement hole 137A and 137b which are used to couple the front and rear case 110 and 120 with the liquid crystal display module 130. Therefore, the number of parts of the LCD 100 increases, and the cost for producing the LCD also increases.

Second, in order to assemble the LCD, the bracket 136 should be coupled with the sidewall of the mold frame 132, the shield case 138 should be fixed on the rear surface of the bottom chassis 134, and the front and rear case 110 and 120 should be coupled with the liquid crystal display module 130.

Therefore, the number of processes for assembling the LCD increases and the productivity of the LCD wholly decreases.

DISCLOSURE OF INVENTION

For these aforementioned reasons, it is an object of the present invention to provide an LCD, which can simplify the process for assembling the LCD and increase the productivity of the LCD.

To achieve the object of the present invention, there is provided a liquid crystal display device including a back light assembly for emitting a light, a display unit for displaying an image by controlling a transmissivity of the light using a liquid crystal, a first receiving means for receiving the back light assembly and the display unit, a second receiving means, coupled with the first receiving means to be opposite to the first receiving means, for guiding the display unit, and a shielding means, formed on a rear surface of the first receiving means, for cutting off an electromagnetic wave from the display unit, a first sidewall of the shielding means directly coupled with a second sidewall of the second receiving means, the second side wall being opposite to the first sidewall.

The first sidewall is disposed parallel to the second sidewall, and the first and the second sidewall are coupled below the first receiving means.

The LCD further includes a front case disposed in front of the top chassis and a rear case coupled with the top chassis in the rear of the mold frame, the rear case being opposite to the top chassis.

At least one engagement hole is formed respectively at the first sidewall and the second sidewall, an engagement hole of the first sidewall corresponding to an engagement hole of the second sidewall.

The first sidewall, the second sidewall, the front case and the rear case are coupled with one another by means of a screw passing through the engagement hole. Also, a burring is projected from the first sidewall toward an advancing direction of the screw to be coupled with the screw.

According to this LCD, a first sidewall of the shield case is extended to contact with a second sidewall of the top chassis, and a burring coupled with the screw is formed to correspond the engagement hole at the second sidewall of the top chassis. Therefore, the production cost can be reduced by decreasing the number of parts of the LCD, and the productivity can be improved by simplifying the assembly process of the LCD.

BRIEF DESCRIPTION OF THE DRAWINGS

The above and other objects and advantages of the present invention will become readily apparent by reference to the following detailed description when considered in conjunction with the accompanying drawings wherein.

BEST MODE FOR CARRYING OUT THE INVENTION

Hereinafter, a liquid crystal display device according to one preferred embodiment of the present invention will be described in detail with reference to the accompanying drawings.

Figure 5:
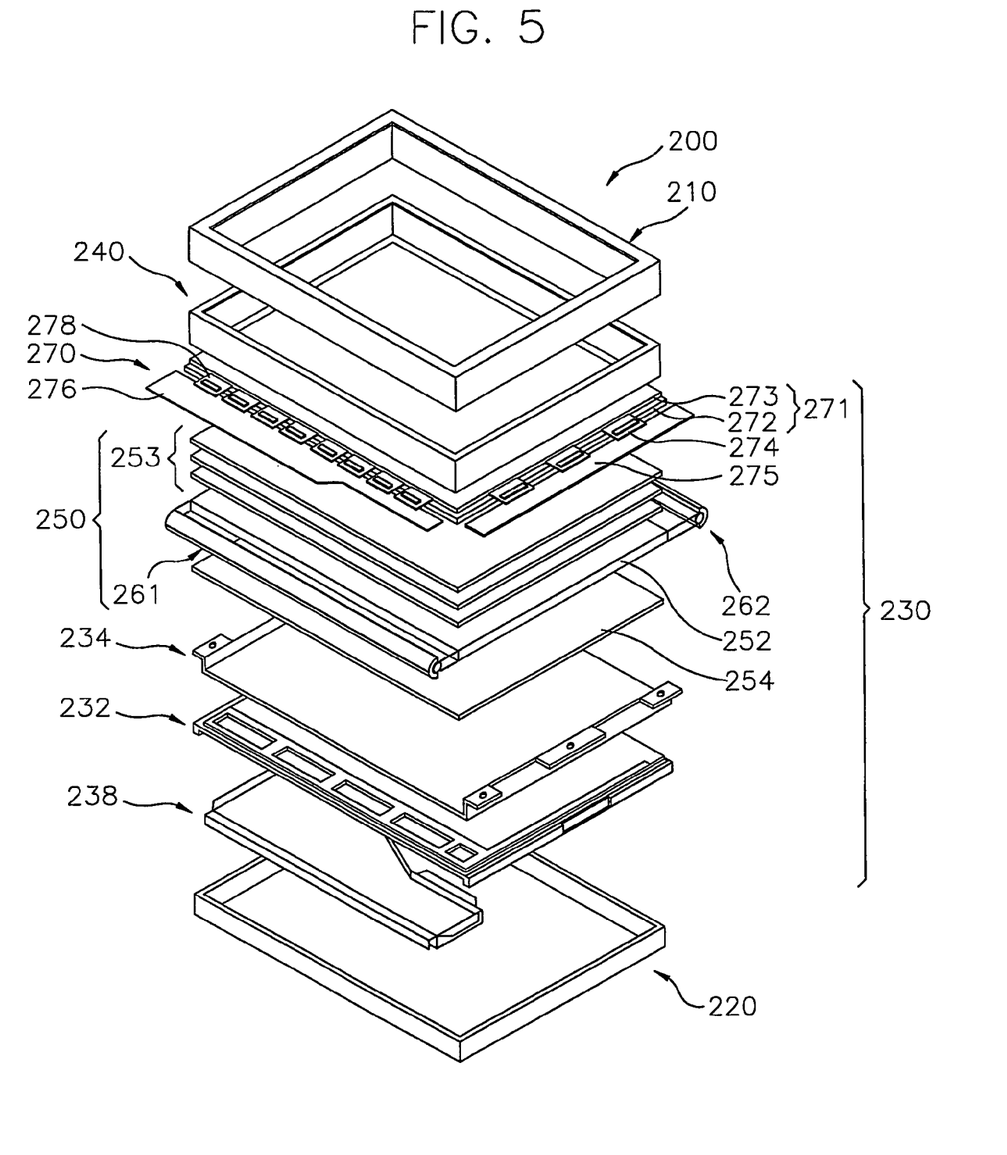
FIG. 5 is an exploded perspective view schematically illustrating the LCD according to one exemplary embodiment of the present invention.

FIG. 5 is an exploded perspective view of an LCD device according to one preferred embodiment of the present invention.

Referring to FIG. 5, the LCD device 200 includes an LCD module 230 for displaying an image, a front case 210 and a rear case 220 for receiving the LCD module 230.

The LCD module 230 includes a display unit 270 having an LCD panel, a back light assembly 250 for providing light to the display unit 270, and a receiving container for receiving the displaying unit 270 and the back light assembly 250.

The display unit 270 includes the LCD panel 271, a data PCB 276 for driving the panel 271, a gate PCB 275 for driving the panel 271, a data tape carrier package (TCP) 278 and a gate TCP 274.

The LCD panel 271 includes a TFT substrate 272, a color filter substrate 273 and liquid crystal (not shown).

The TFT substrate 272 is a transparent glass substrate on which thin film transistors are arranged in a matrix shape. A data line is connected to a source terminal of the thin film transistor, and a gate line is connected to a gate terminal thereof. Also, a pixel electrode consisting of ITO, which is made of transparent and conductive material, is formed at a drain terminal of the thin film transistor.

When an electrical signal is inputted to the data line, the electrical signal is inputted to the source terminal of the TFT, and when an electrical signal is inputted to the gate line, the electrical signal is inputted to the gate terminal of the TFT. The TFT is turned on or turned off depending on the inputted electrical signal. When the TFT is turned on, an electrical signal for generating a required image is outputted to the drain terminal.

The color filter substrate 273 is disposed opposite to the TFT substrate 272. The color filter substrate 273 has RGB pixels formed by thin film process. The RGB pixels are color pixels displaying color images. Common electrodes consisting of ITO are formed on the color filter substrate 273.

When a predetermined voltage of electric voltage is applied to the gate and source terminal of the TFT on the TFT substrate 272 and then the TFT is turned on, an electric field is formed between the pixel electrodes and the common electrode of the color filter substrate 273. The arrangement angle of the liquid crystal interposed between the TFT substrate 272 and the color filter substrate 273 is changed by the electric field. The transmissivity of the light is varied depending on the arrangement angle of the liquid crystal, and each pixel can display a required color.

A driving signal and a timing signal are applied respectively to the gate line and the data line that are respectively connected with the gate electrode and source electrode of the TFT in order to control the arrangement angle and the period of the arrangement of the liquid crystal in the LCD panel 271.

As shown in FIG. 5, the data TCP 278 is a kind of a flexible PCB determining the time to apply a data driving signal, and the data TCP 278 is formed at a region (what is called as a source side) where the terminal of the data line in the LCD panel 271 is formed. In addition to, the gate TCP 274 is formed at a region (what is called as a gate side) where the terminal of the gate line is formed in order to determine the time to apply a gate driving signal.

The data PCB 276 is electrically connected to the data TCP 278 of the LCD panel 271, and the gate PCB 275 is electrically connected to the gate TCP 274 of the LCD panel 271. Therefore, the data PCB 276 and gate PCB 275 receive an image signal from an external source and apply the driving signal respectively to the gate line and the data line through the data TCP 278 and the gate TCP 274, respectively.

The back light assembly 250 is disposed below the display unit 270 to provide uniform light to the display unit 270. The back light assembly 250 includes a first and a second lamp unit 261 and 262 for emitting light, and each of the first and the second lamp unit 261 and 262 has a lamp therein.

A light guide plate (LGP) 252 is actually as large as the LCD panel 271. The LGP 252 guides the light emitted from the first and second lamp unit 261 and 262 toward the LCD panel 271, and changes a path of the light.

A plurality of optical sheets 253 are formed over the LGP 252, the optical sheets 253 enhance the uniformity of brightness of the light that is emitted from the LGP 252 and transmitted toward the LCD panel 271. Also, a reflection plate 254 is disposed below the LGP 252. The reflection plate 254 reflects a light that is leaked from the LGP 252 back to the LGP 252, to thereby improve the effectiveness of the light.

The receiving container includes a mold frame 232 for receiving the back light assembly 250. The mold frame 232 has four sidewalls, and a bottom surface is partially opened. The mold frame 232A receives a bottom chassis 234. The bottom chassis 234 has two sidewalls and a bottom face. A stepped sill is formed at each sidewall of the bottom chassis 234, the stepped sill being extended outward from the upper portion of the sidewall. When the bottom chassis 234 is received in the mold frame 232, the stepped sill of the bottom chassis 234 is disposed on both sidewalls of the mold frame 232.

When the bottom chassis 234 is received in the mold frame 232, the back light assembly is received in the mold frame 232 and is disposed on the bottom face of the bottom chassis 234. Then, the display unit 270 is disposed in the mold frame 232. The data PCB 276 is mounted on the rear surface of the bottom chassis 234 so as to reduce the surface area of the LCD panel. Namely, the data TCP 278 connecting the LCD panel 271 and the data PCB 276 covers the sidewall of the mold frame 232 and is extended to the rear surface of the mold frame 232, so that the data PCB 234 is disposed on the rear surface of the mold frame 232.

An inverter board (not shown) for supplying electric power and an A/D board (not shown) for converting the image signal are installed on the rear surface of the bottom chassis 234. The shield case 238 for cutting off electromagnetic waves receives the inverter board and the A/D board, a sidewall is formed at one portion of the shield case 238. The sidewall of the shied case 238 is extended toward the rear case 220.

A top chassis 240 is disposed on the display unit 270 to prevent the display unit 270 from being separated from the mold frame 232. The top chassis 240 has four sidewalls and a top surface extended from the sidewalls by a predetermined length, so that each sidewalls and the top surface form a cramp. The top surface presses the LCD panel toward the mold frame 232, and the four sidewalls of the top chassis 240 are opposite to the four sidewalls of the mold frame 232. One of the sidewalls of the top chassis 240 is extended longer than other sidewalls of the top chassis 240 so as to be coupled with a sidewall of the shield case 238 to be opposite thereto.

Figure 6:
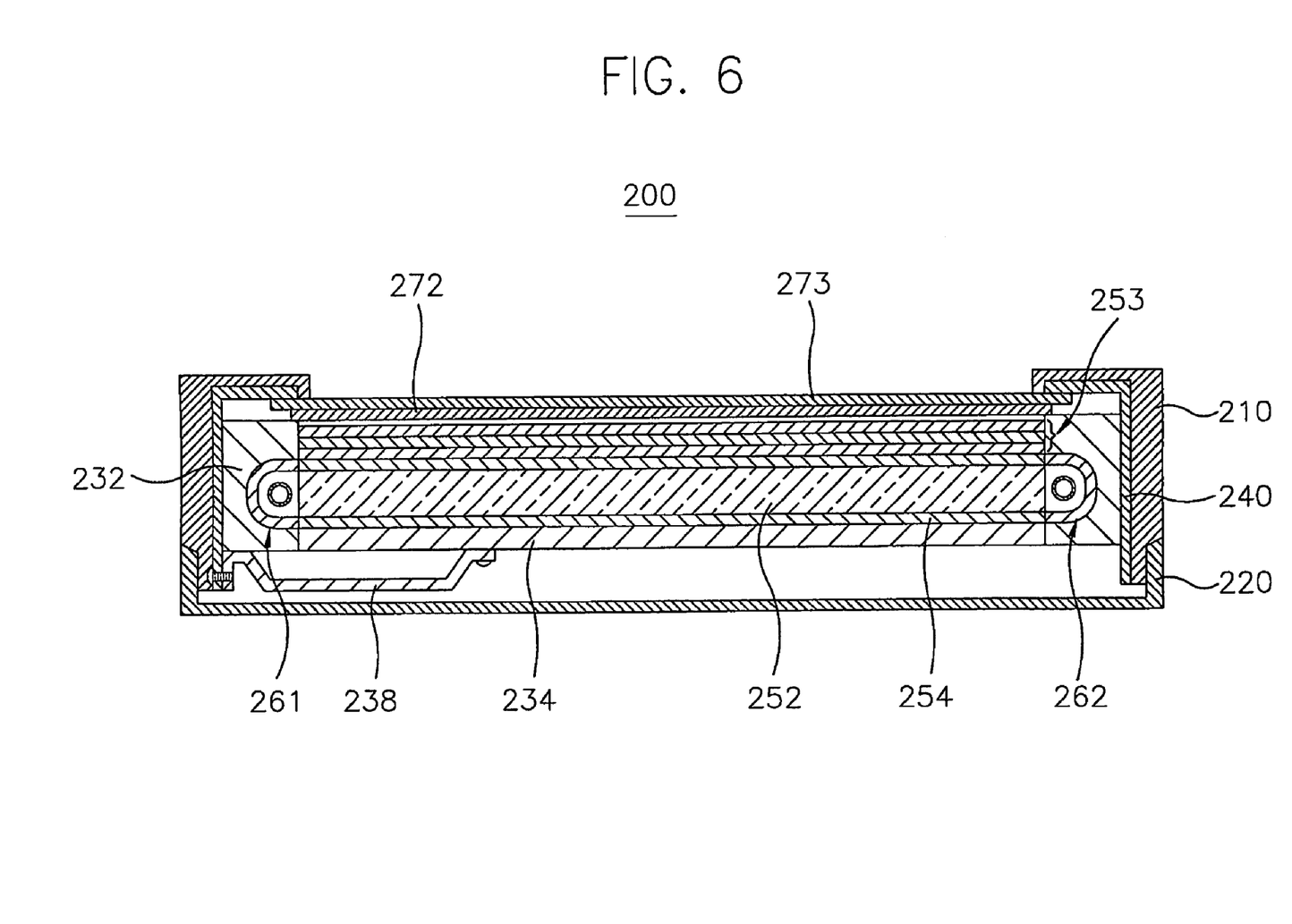
FIG. 6 is a sectional view illustrating the structure of the LCD in FIG. 5.

FIG. 6 is a sectional view illustrating the structure of the LCD in FIG. 5.

Referring to FIG. 6, the bottom chassis 234 received in the mold frame 232, receives the reflection plate 254, the LGP 252, the optical sheets 253, the TFT substrate 272 and the color filter substrate 273 sequentially. Then the shield case 238 is installed on the rear surface of the bottom chassis 234. A sidewall of the shield case 238 is extended toward the rear case 220. Then, the top chassis 240 is installed to be opposite to the mold frame 232. The sidewall of the top chassis 240 directly contacts with the extended sidewall of the shield case 238.

The shield case 238 has a cover face for receiving the inverter board and A/D board which is disposed on the rear surface of the bottom chassis 234, and the shield case 238 also has a bended sidewall extended from the cover face, the bended sidewall of the shield case 238 being parallel to the sidewall of the top chassis 240. The sidewall of the top chassis 240 contacts with the corresponding bended sidewall of the shield case 238 under a lower surface of the mold frame 232.

An engagement hole is commonly formed at both the bended sidewall of the shield case 238 and the corresponding sidewall of the top chassis 240, and the shield case 238 and the top chassis 240 are coupled by a screw 238c through the engagement hole.

Hereinafter, a coupling structure of the shield case 238 and the top chassis 240, and a coupling structure between the shield case 238, the top chassis 240 and the cases 210 and 220 will be described in detail with reference to FIG. 7A to FIG. 8.

Figure 7A:
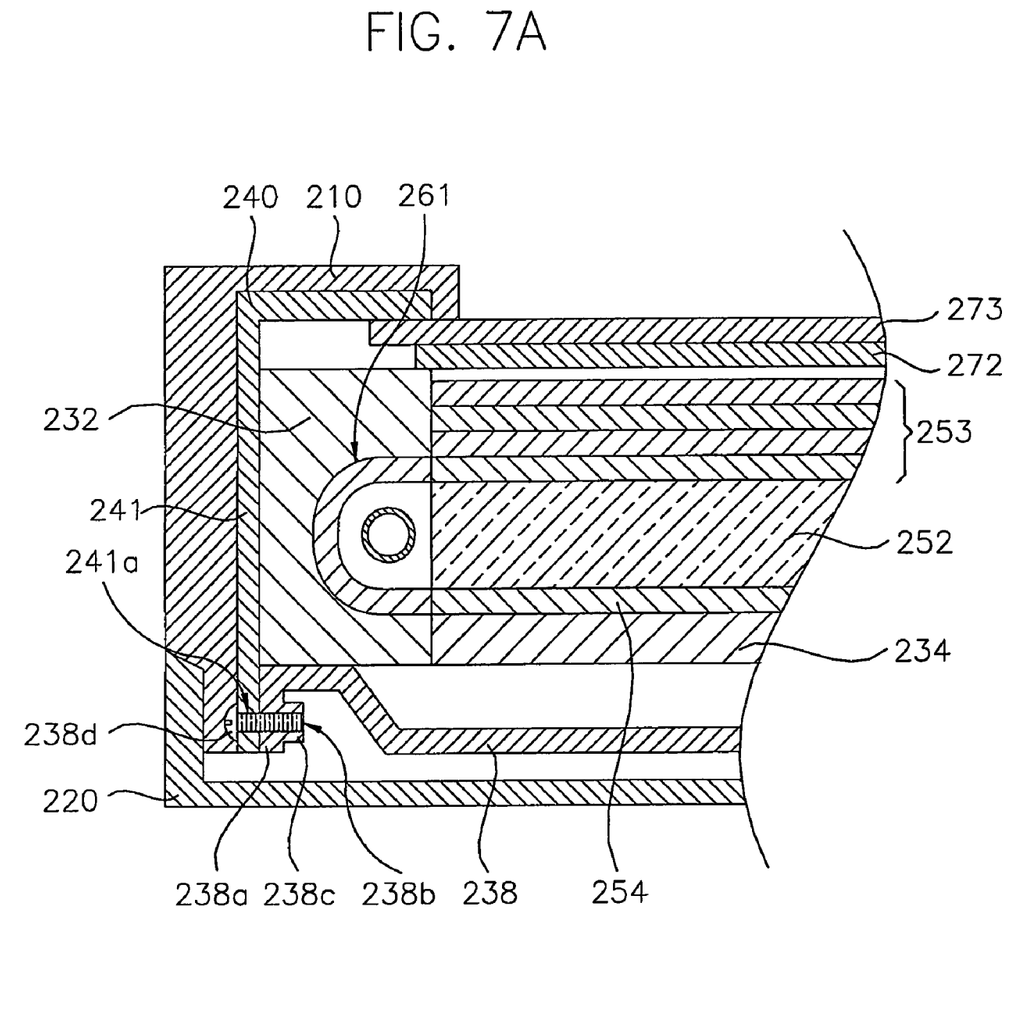
FIG. 7A and FIG. 7B are partially enlarged sectional views illustrating the coupling structure of the LCD in FIG. 5.
Figure 7B:
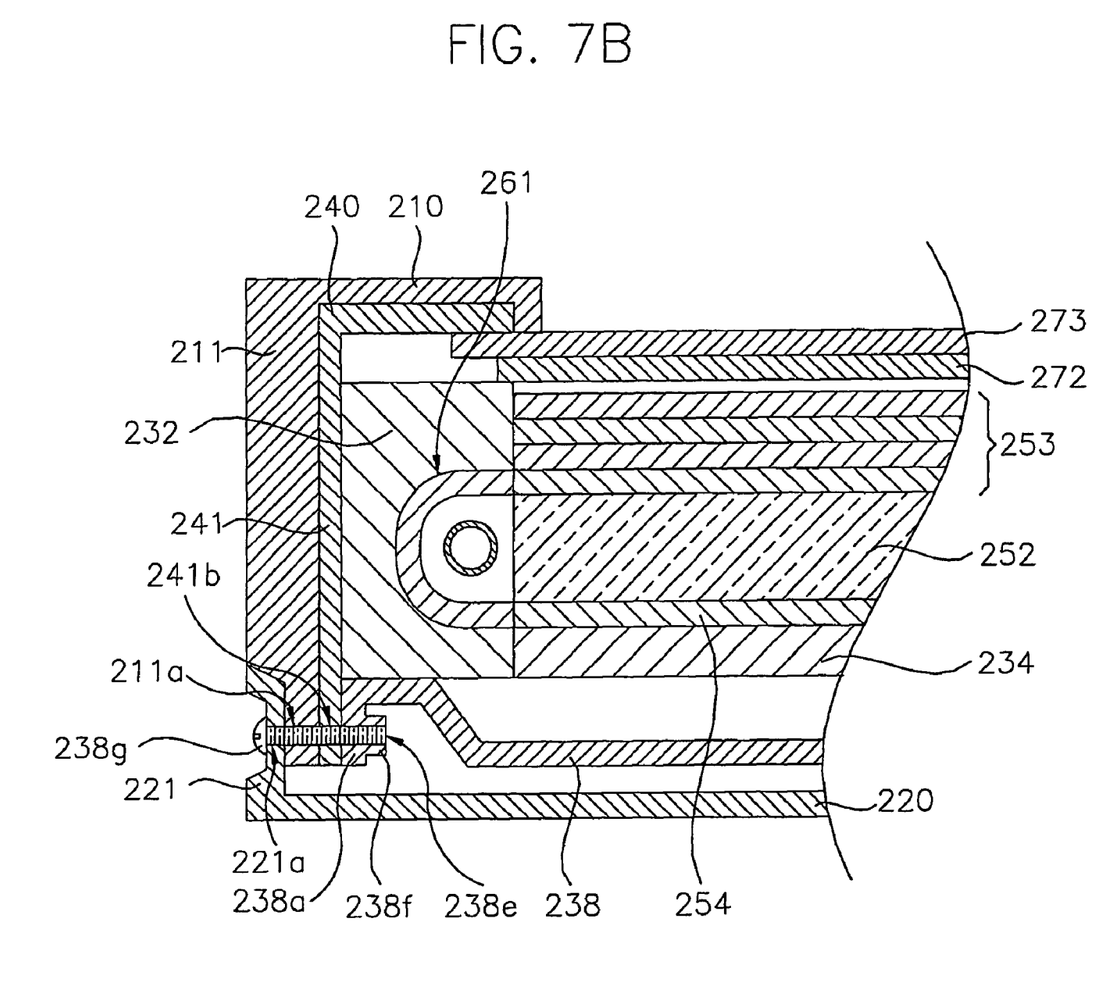
Figure 8:
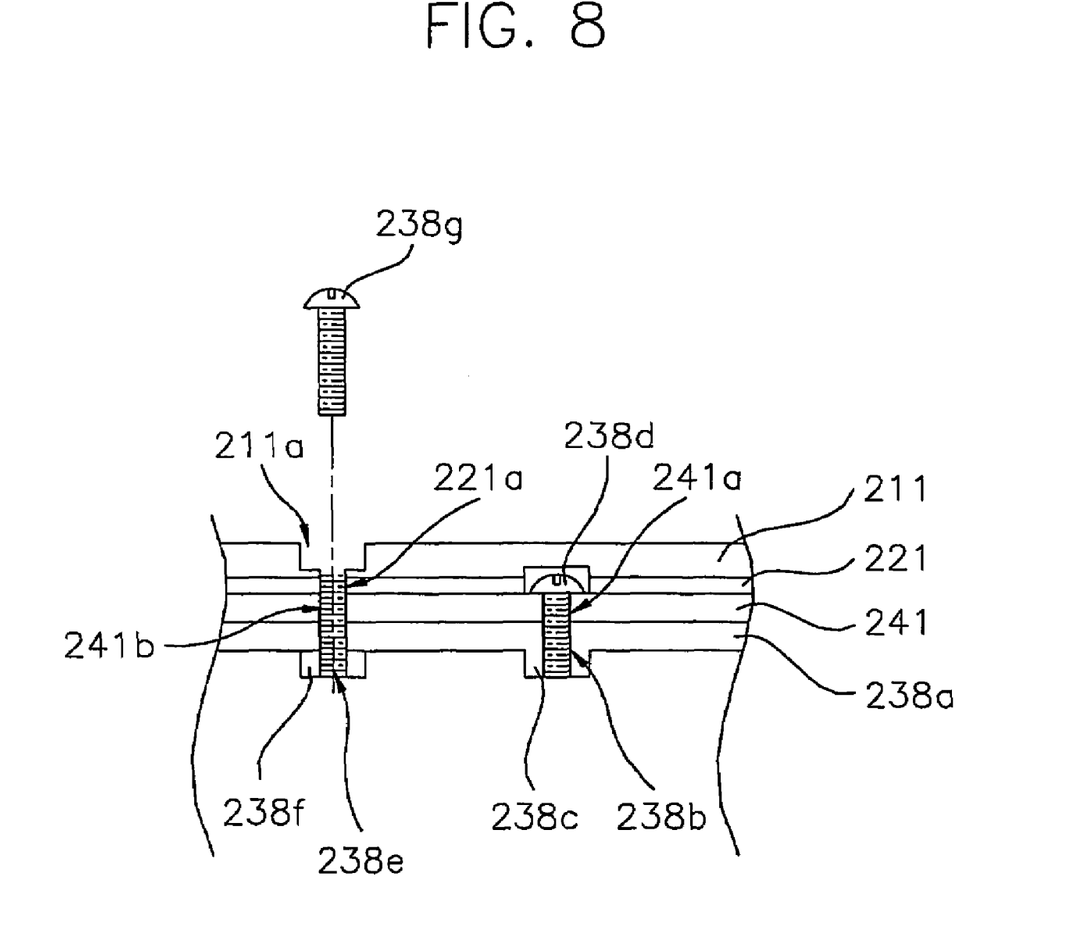
FIG. 8 is a partially enlarged sectional view illustrating the coupling structure of the LCD in FIG. 5.

FIG. 7A and FIG. 7B are partially enlarged sectional views illustrating the coupling structure of the LCD in FIG. 5, and FIG. 8 is a partially enlarged sectional view illustrating coupling structure of the LCD in FIG. 5.

Referring to FIG. 7A and FIG. 8, the sidewall 238a of the shield case 238 adjacent to the first lamp unit 261 is disposed to be opposite to the sidewall 241 of the top chassis 240, the sidewall 241 being extended to the lower face of the mold frame 232. As shown in FIG. 7A and FIG. 8, the sidewalls of both the top chassis 240 and the shield case 238 are coupled to be overlapped, and a first engagement hole 241a and a second engagement hole 238b is commonly formed at the overlapped portion of the sidewalls 241 and 238a, respectively.

In addition to, a first burring 238c is perpendicularly projected from the inner surface of the sidewall 238a of the shield case 238. Here, the second engagement hole 238b is formed to be extended through the first burring 238c. The top chassis 240 and the shield case 238 are coupled by means of the first screw 238d passing through the first and second engagement holes 241a and 238b.

Referring to FIG. 7B and FIG. 8, the sidewall 238a of the shield case 238 adjacent to the first lamp unit 261 is extended to be opposite to the sidewall 241 of the top chassis 240, the sidewall 241 of the top chassis 240 being extended to the lower face of the mold frame 232. The sidewalls of both the top chassis 240 and the shield case 238 are overlapped, and a third engagement hole 241b and a fourth engagement hole 238e are commonly formed at the overlapped portion of the sidewalls 241 and 238a, respectively.

In addition to, a second burring 238f is perpendicularly projected from the inner surface of the sidewall 238a of the shield case 238. Also, a fifth engagement hole 221a is formed at a sidewall 211 of the front case 210, the fifth engagement hole 221a corresponding to the third and the forth engagement hole 241b and 238e, and a sixth engagement hole 221a is formed at a sidewall 221 of the rear case 220 corresponding to the engagement holes 241b and 238e.

Therefore, the top chassis 240, the shield case 238, the front case 210 and the rear case 220 are coupled by means of a second screw 238g passing through the third, the forth, the fifth and the sixth engagement holes 241b, 238e, 211a and 221a.

Figure 9:
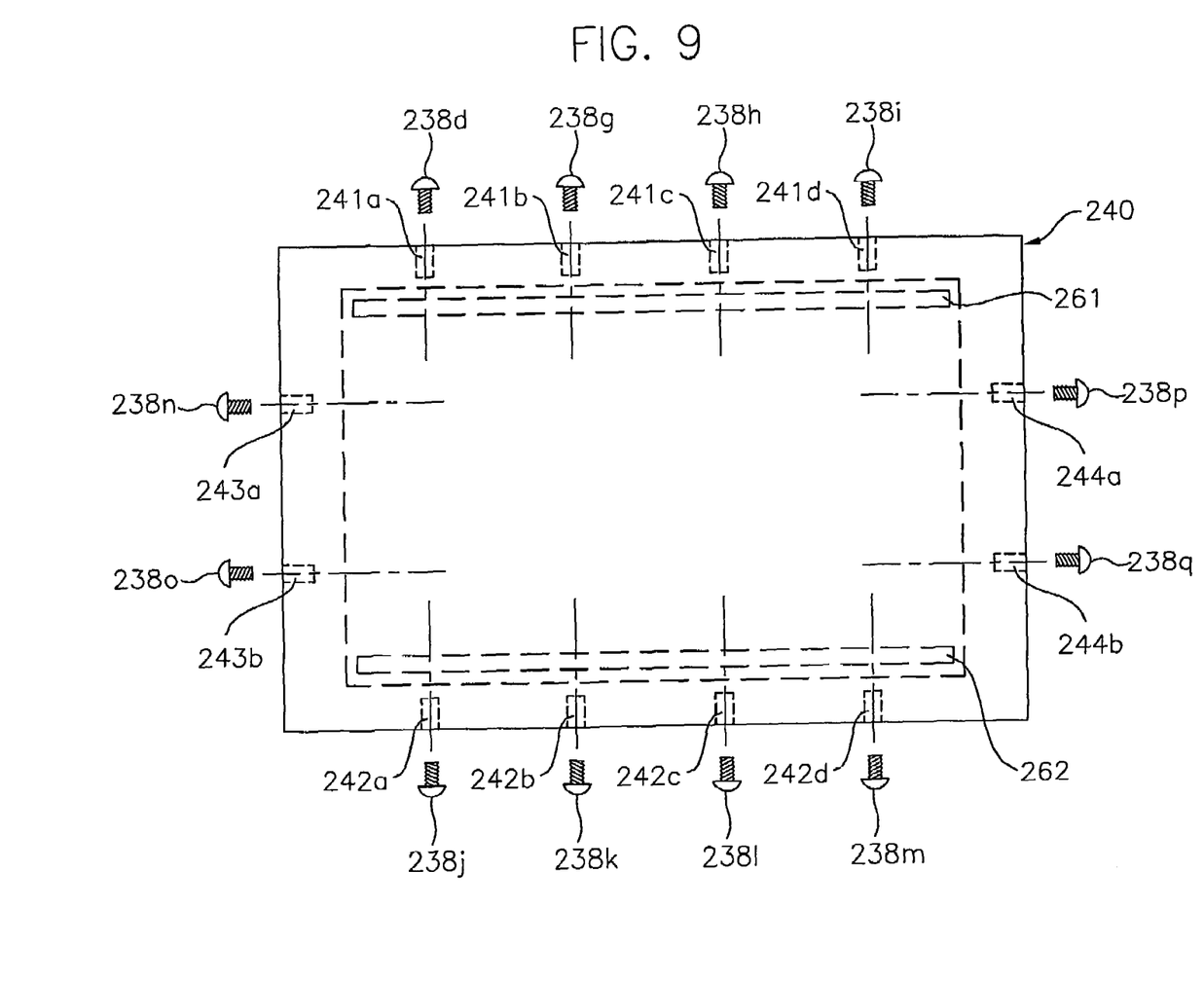
FIG. 9 is a plane view illustrating a coupling structure of the LCD in FIG. 5.

FIG. 9 is a plane view illustrating a coupling structure of the LCD device in FIG. 5.

Referring to FIG. 9, engagement holes 241a, 241b, 241c, 241d, 242a, 242b, 242c and 242d are separated by a predetermined interval at the first and second sidewall 241 and 242, and the first and second sidewall 241 and 242 of the four sidewalls 241, 242, 243 and 244 are disposed adjacent to the first and the second lamp unit 261 and 262. Also, the engagement holes 243a, 243b, 244a and 244b are separated by a predetermined interval at the third and forth sidewall 243 and 244.

A first group is composed of the engagement holes 241a, 241d, 242a and 242d of the abovementioned engagement holes, and the top chassis 240 and the shield case 238 are coupled by means of the screws 238d, 238i, 238j and 238m passing through the engagement holes 241a, 241d, 242a and 242d of the first group. Also, a second group is composed of the engagement holes 241b, 241c, 242b, 242c, 243a, 243b, 244a and 244b of the abovementioned engagement holes, and the top chassis 240 is are coupled respectively with the shield case 238, the front case 210 and the rear case 220 by means of the screws 238g, 238h, 238k, 238l, 238n, 238o, 239p and 238q passing through the engagement holes 241b, 241c, 242b, 242c, 243a, 243b, 244a and 244b of the second group, respectively. When the front case 210 and the rear case 220 are coupled with the LCD module 230, the LCD device is completely assembled.

As shown in FIG. 9, two engagement holes of the engagement holes 241a, 241d, 242a and 242d in the first group are formed at the first or the second sidewall 241 or 242 according to the present embodiment. However, in other embodiments, referring to the first group, the number of engagement holes and the location of the engagement holes at the first and the second sidewall 241 and 242 can be changed. Besides, in other embodiments of the present invention, referring to the second group, the number of engagement holes and the location of the engagement holes is not restricted to the number and location as shown in FIG. 9, but can be changed.

Figure 10:
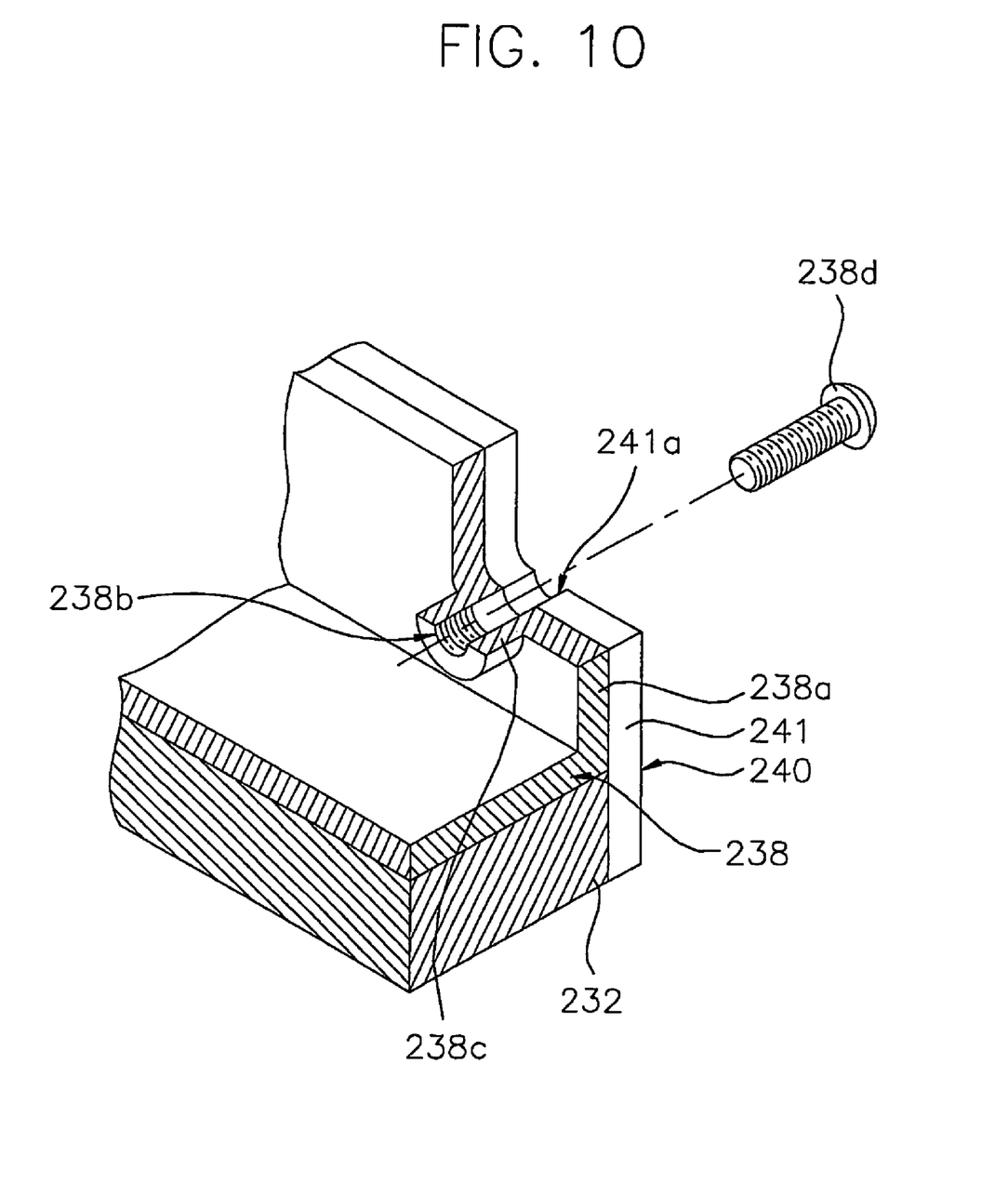
FIG. 10 and FIG. 11 are partial sectional views illustrating the coupling structure of the LCD in FIG. 5.
Figure 11:
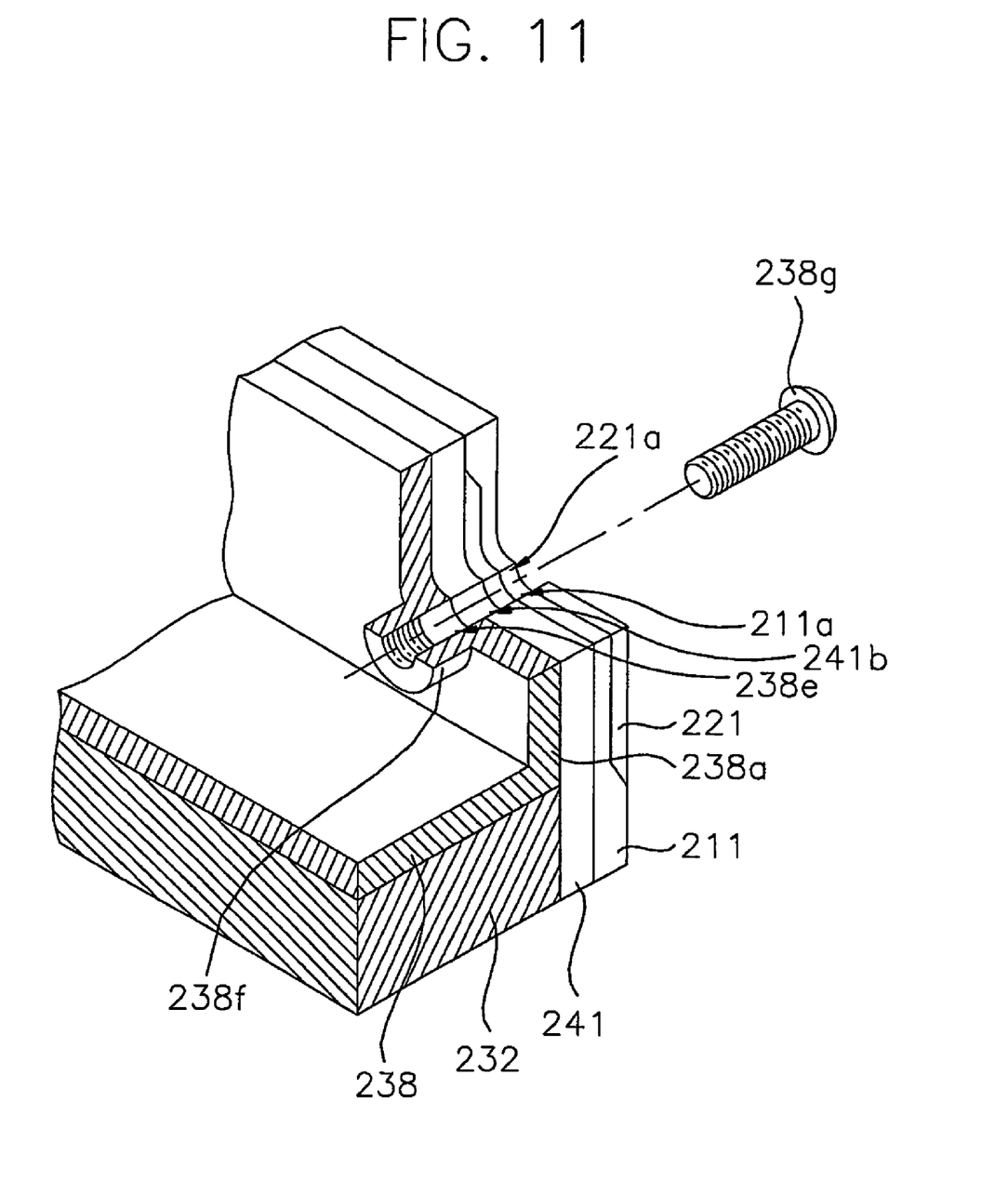

FIG. 10 and FIG. 11 are partial sectional views illustrating the coupling structure of the LCD in FIG. 5.

Referring to FIG. 10, the top chassis 240 is disposed so as to cover the sidewalls of the mold frame 232, and the shield case 238 is installed below the mold frame 232. The sidewall 241 of the top chassis 240 is directly contacted with the sidewall 238a of the shield case 238. The first engagement hole 241a formed at the sidewall 241 of the top chassis 240 corresponds to the second engagement hole 238b formed at the sidewall 283a of the shield case 238. The first screw 238d passes through the first and the second engagement hole 241a and 238b, and is coupled with to the first burring 238c of the shield case 238.

As shown in FIG. 11, the front case 210 is disposed on the top chassis 240, and the rear case 220 is disposed under the shield case 238. So that, the front case 210 and the rear case 220 are coupled with the LCD module 230.

The third engagement hole 241b is formed at the sidewall 241 of the top chassis 240, and the forth engagement hole 238e is formed at the sidewall 238a of the shield case 238 to correspond to the third engagement hole 241b. Also, the fifth and the sixth engagement hole 211a and 221a are formed at the sidewalls 211 and 221 of the front and the rear case 210 and 220, respectively, to correspond to the third and the forth engagement hole 241a and 238e. Therefore, the second screw 238g passes successively through the third, fourth, fifth and sixth engagement hole 241b, 238e, 211a and 221a, and is coupled with the second burring 238e formed at the shield case 238. So, the LCD device is completely assembled.

INDUSTRIAL APPLICABILITY

According to the abovementioned LCD device, a first sidewall of a shield case is disposed to contacted with a second sidewall of a top chassis, the first sidewall corresponding to the second sidewall. An engagement hole is formed at the sidewall of the shield case corresponding to the second sidewall of the top chassis, and a burring is formed at the first sidewall of the shied case to correspond to the engagement hole formed at the second sidewall of the top chassis.

Therefore, the cost for production can be reduced by decreasing the number of the parts used in the LCD, and the productivity can be improved due to a simplification of the assembly process of the LCD.

Although preferred embodiment of the present invention have been described, it is understood that the present invention should not be limited to these preferred embodiment but various changes and modifications can be made by one skilled in the art within the spirit and scope of the present invention as hereinafter claimed.

The invention claimed is:

1. A liquid crystal display device, comprising:
   a back light assembly for emitting a light;
   a display unit for displaying an image by controlling a transmissivity of the light using a liquid crystal;
   a first receiving means for receiving the back light assembly and the display unit;
   a second receiving means, coupled with the first receiving means to be opposite to the first receiving means, for guiding the display unit; and,
   a shielding means, formed on a rear surface of the first receiving means, for cutting off an electromagnetic wave from the display unit, a first sidewall of the shielding means being directly coupled with a second sidewall of the second receiving means, the second sidewall being disposed opposite to the first sidewall,
   wherein the first and the second sidewalls are coupled to each other below the first receiving means.

2. The liquid crystal display device in clam 1, wherein the first sidewall is disposed parallel to the second sidewall.

3. The liquid crystal display device in claim 1, wherein at least one engagement hole is formed respectively at the first sidewall and the second sidewall, an engagement hole of the first sidewall corresponding to an engagement hole of the second sidewall.

4. The liquid crystal display device in claim 3, wherein the second receiving means is coupled with the shielding means by means of a screw passing through the engagement holes.

5. The liquid crystal display device in claim 4, wherein a burring is projected from the first sidewall toward an advancing direction of the screw to be coupled with the screw.

6. The liquid crystal display device in claim 1, further comprising:
   an inverter board installed on a rear surface of the first receiving means to supply electric power; and,
   an A/D board installed on the rear surface of the first receiving means to convert an image signal, wherein the shielding means receives the inverter board and the A/D board.

7. A liquid crystal display device, comprising:
a back light assembly for emitting a light;
a display unit for displaying an image by controlling a transmissivity of the light using a liquid crystal;
a first receiving means for receiving the back light assembly and the display unit;
a second receiving means, coupled with the first receiving means to be opposite to the first receiving means, for guiding the display unit;
a shielding means, formed on a rear surface of the first receiving means, for cutting off an electromagnetic wave from the display unit, a first sidewall of the shielding means being directly coupled with a second sidewall of the second receiving means, the second side wall being disposed opposite to the first sidewall;
a front case coupled with a front face of the second receiving means to cover at least the front face of the second receiving means; and,
a rear case coupled with the second receiving means to be disposed at a rear of the first receiving means,
wherein at least one engagement hole is respectively formed at the first sidewall, the second sidewall, the front case and the rear case, and engagement holes of the first sidewall, the second sidewall, the front case and the rear case correspond to one another.

8. The liquid crystal display device in claim 7, wherein the second receiving means, the shielding means, the front case and the rear case are coupled by means of a screw passing through the engagement holes.

9. The liquid crystal display device in claim 8, wherein a burring is projected from the first sidewall toward an advancing direction of the screw to be coupled with the screw.

10. A liquid crystal display device, comprising:
a back light assembly for emitting a light;
a display unit for displaying an image by controlling a transmissivity of the light using a liquid crystal;
a first receiving means for receiving the back light assembly and the display unit;
a second receiving means, coupled with the first receiving means to be opposite to the first receiving means, for guiding the display unit;
at least one printed circuit board mounted on a rear surface of the first receiving means; and,
a shield case disposed on the rear surface of the first receiving means and enclosing the at least one printed circuit board, the shield case cutting off an electromagnetic wave generated by the at least one printed circuit board from the display unit, a first sidewall of the shield case being directly coupled by a coupling structure with a second sidewall of the second receiving means, the second side wall being disposed opposite to the first sidewall, wherein the first sidewall is disposed parallel to the second sidewall, and the first and second sidewalls are coupled to each other below the first receiving means.

11. The liquid crystal display device in claim 10, wherein at least one engagement hole is formed respectively at the first sidewall and the second sidewall, an engagement hole of the first sidewall corresponding to an engagement hole of the second sidewall.

12. The liquid crystal display device in claim 11, wherein the second receiving means is coupled with the shield case by the coupling structure, the coupling structure including a screw passing through the engagement holes.

13. The liquid crystal display device in claim 12, wherein a burring is projected from the first sidewall toward an advancing direction of the screw to be coupled with the screw.

14. The liquid crystal display device in claim 10, further comprising:
a front case coupled with a front face of the second receiving means to cover at least the front face of the second receiving means; and,
a rear case coupled with the second receiving means to be disposed at a rear of the first receiving means.

15. The liquid crystal display device in claim 14, wherein at least one engagement hole is respectively formed at the first sidewall, the second sidewall, the front case and the rear case, and engagement holes of the first sidewall, the second sidewall, the front case and the rear case correspond to one another.

16. The liquid crystal display device in claim 15, wherein the second receiving means, the shield case, the front case and the rear case are coupled by coupling structure, the coupling structure comprising a screw passing through the engagement holes.

17. The liquid crystal display device in claim 16, wherein a burring is projected from the first sidewall toward an advancing direction of the screw to be coupled with the screw.

18. The liquid crystal display device in claim 10, wherein the at least one printed circuit board comprises:
an inverter board installed on the rear surface of the first receiving means to supply electric power; and,
an A/D board installed on the rear surface of the first receiving means to convert an image signal,
wherein the shielding means receives the inverter board and the A/D board.

* * * * *